Aug. 19, 1941.  W. G. ANDERSON, JR  2,253,008
SHIPPING AND DISPLAY BOX
Filed April 26, 1939  5 Sheets-Sheet 1
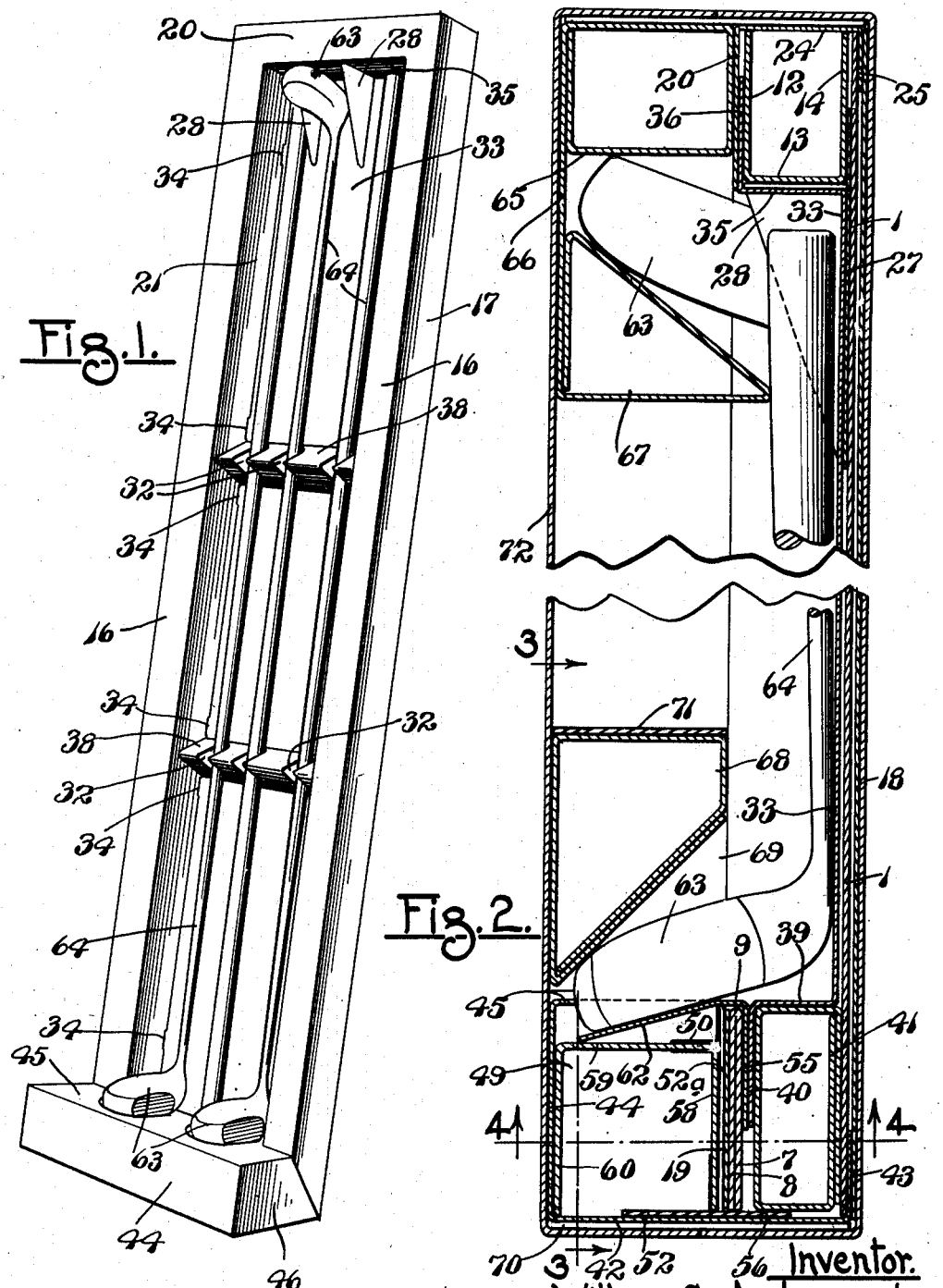
Inventor.
Wilbur G. Anderson, Jr.
Attorneys

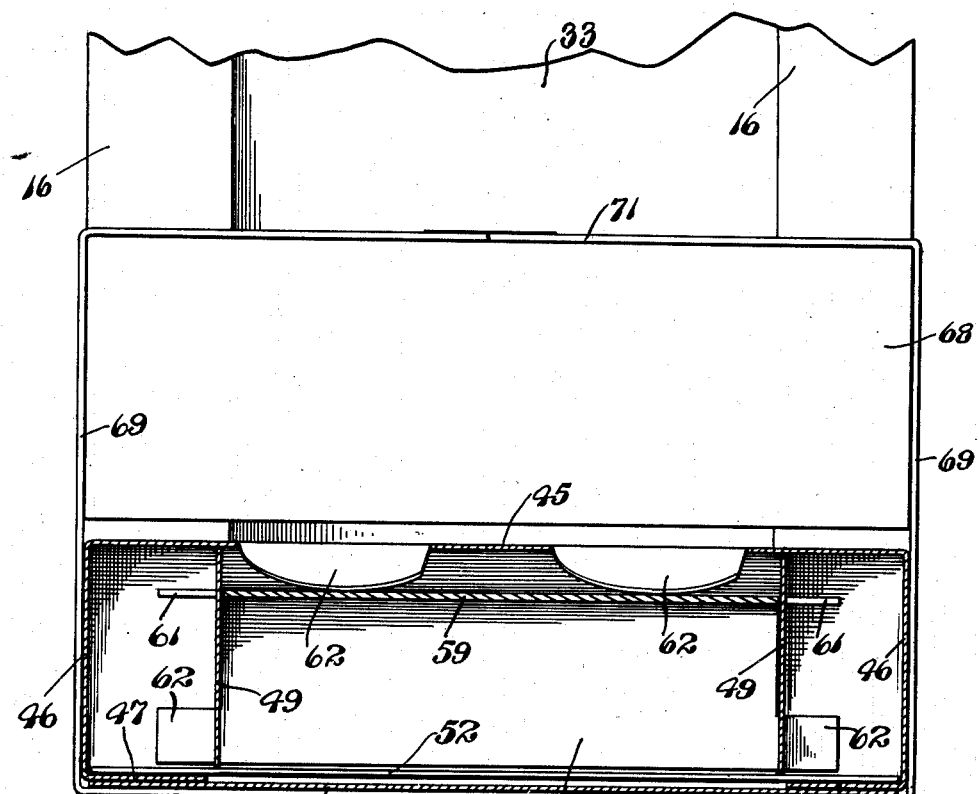
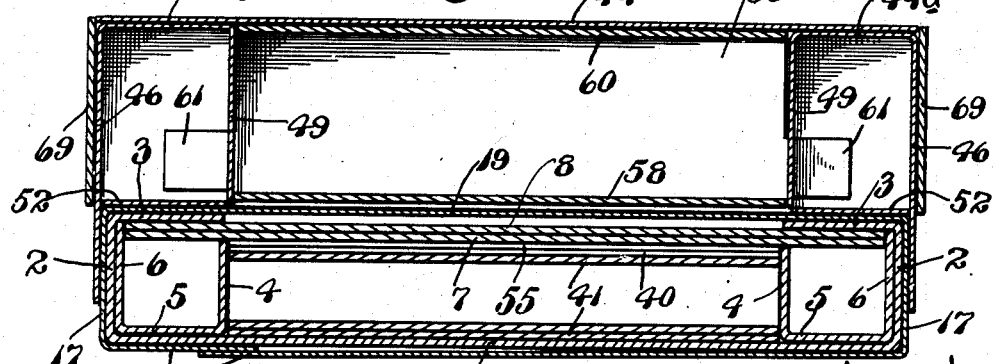

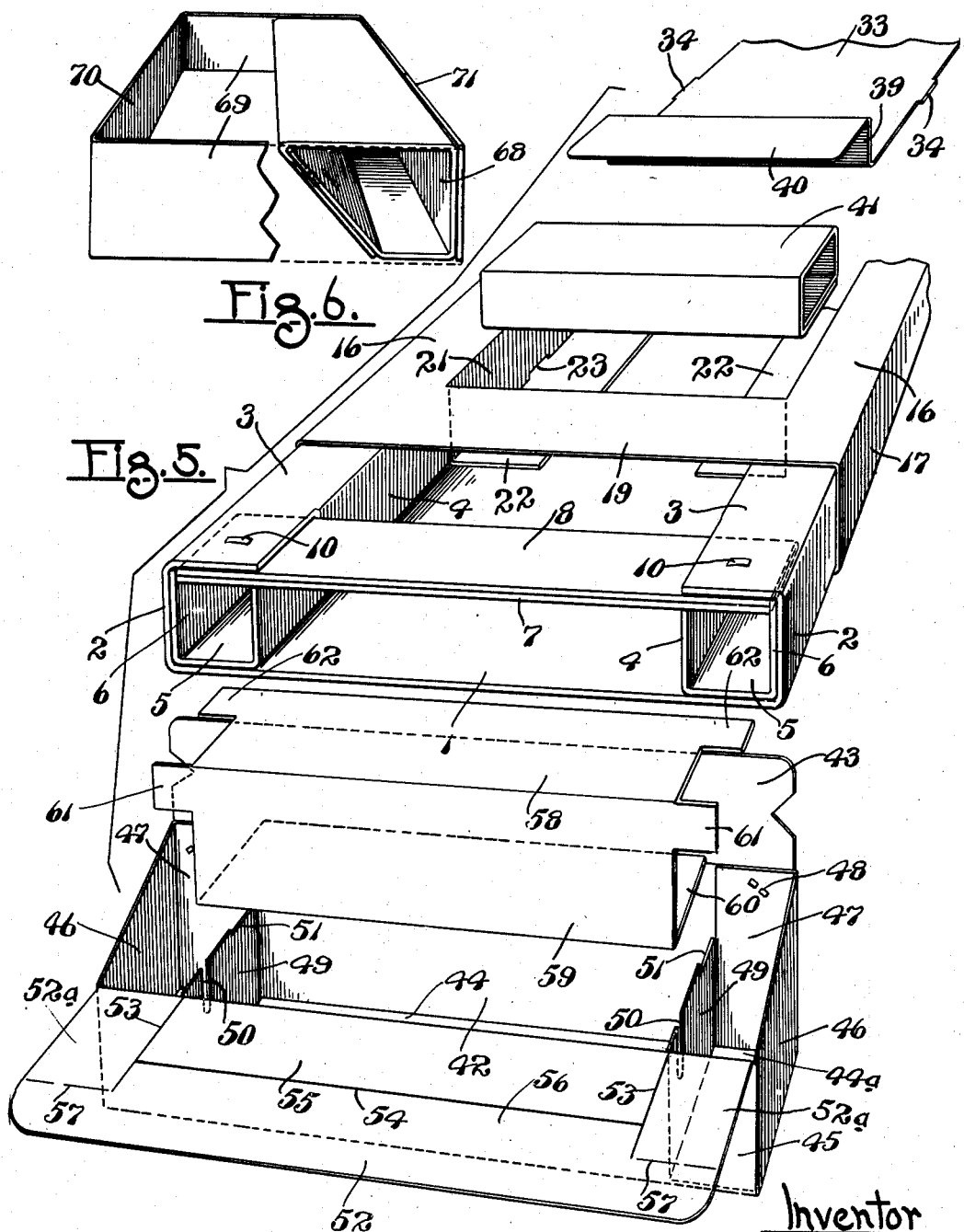

Aug. 19, 1941.  W. G. ANDERSON, JR  2,253,008
SHIPPING AND DISPLAY BOX
Filed April 26, 1939    5 Sheets-Sheet 4

Inventor
Wilbur G. Anderson, Jr.
By Liverance and
Van Antwerp
Attorneys

Aug. 19, 1941.  W. G. ANDERSON, JR  2,253,008
SHIPPING AND DISPLAY BOX
Filed April 26, 1939  5 Sheets-Sheet 5

Inventor
Wilbur G. Anderson, Jr.
By Lisenanee and
Van Antwerp
Attorneys

Patented Aug. 19, 1941

2,253,008

UNITED STATES PATENT OFFICE 2,253,008

SHIPPING AND DISPLAY BOX

Wilbur G. Anderson, Jr., Grand Rapids, Mich., assignor to American Box Board Company, Grand Rapids, Mich., a corporation of Michigan Application April 26, 1939, Serial No. 270,058

16 Claims. (Cl. 211—60)

This invention relates to a display stand which may be readily assembled from elements all preferably made of paper or paper board, which in its assembled form is adapted to hold and retain articles, especially golf clubs, and when holding such articles of merchandise may be packed within an enclosing container which likewise will be of paper board stock. After the display stand has been shipped and has reached its destination it may be taken from the shipping container and used solely as a display stand or easel for the golf clubs which it carries, displaying them in an especially attractive manner.

The present invention is directed to a novel construction of display stand and merchandise holder and carrier made entirely of paper or paper board stock, whereby it is light in weight, yet strong and rigid and capable of withstanding any of the necessary service to which it may be subjected in use, either in shipping or in showing the articles which it is designed to display. While the invention is illustrated in connection with holding and displaying golf clubs, it is to be understood that other articles may be shipped and held and displayed in the display stand of my invention either in the specific form shown or in other variations of the form adapting them to different types of articles of an elongated nature. The invention while specifically disclosed in connection with the shipment and display of golf clubs, is not to be limited in use thereto.

An understanding of the invention may be had from the following description, taken in connection with the accompanying drawings, in which:

Fig. 1 is a perspective view of the display stand of my invention as it is used in exhibiting and displaying golf clubs.

Fig. 2 is a longitudinal vertical section through a shipping receptacle in which a display stand and clubs are enclosed for shipment, the display stand also being shown in longitudinal section.

Fig. 3 is a fragmentary vertical section substantially on the plane of the line 3—3 of Fig. 2, looking in the direction indicated by the arrows.

Fig. 4 is a horizontal section on the plane of line 4—4 of Fig. 2, looking in an upward direction as indicated.

Fig. 5 is a fragmentary perspective view illustrative of the construction of the stand at the lower end portion thereof, with the parts in disassembled and unfolded form.

Fig. 6 is a perspective view showing one of the retaining packing members used when the display stand is enclosed in a shipping receptacle for transportation.

Like reference characters refer to like parts in the different figures of the drawings.

Figure 7:
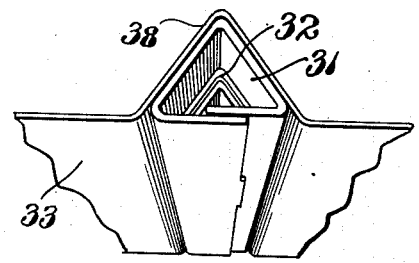
Fig. 7 is a fragmentary perspective view and end elevation showing one of the slotted holders, a number of which are used in the length of the display stand for properly positioning and spacing the golf clubs displayed.

In the construction of the stand of my invention, a rectangular section or flat sheet 1 of paper board material is turned at each longitudinal side edge at right angles for a short distance as at 2, then turned inwardly as at 3 parallel to the plane of the section 1, then again at right angles downwardly and inwardly as indicated at 4, again at right angles to make a section 5 which lies against the upper face of the sheet 1, terminating in a vertical section 6 lying against the inner side of each section 2, as shown in Fig. 5. This provides in effect rails, one at each longitudinal side edge of the backing sheet 1. The rails are in hollow form and are formed and shaped and bent into the substantially square cross-section shown, a proper scoring or perforation of the paper board on parallel lines being used, as will be evident. At the lower ends of the side rails which are thus made and immediately below the outer faces 3 thereof, slots are cut at the juncture of the sections 3 and 4. A cross bar is formed of a single section of paper board material bent upon itself to provide upper and lower laminations 7 and 8 (Fig. 5) which are integrally joined by the bend at 9 connecting them (Fig. 2). The outer ends of the cross bar thus made may be connected permanently, as by staples shown at 10, with the overlapping portions of the parts 3.

Figure 8:
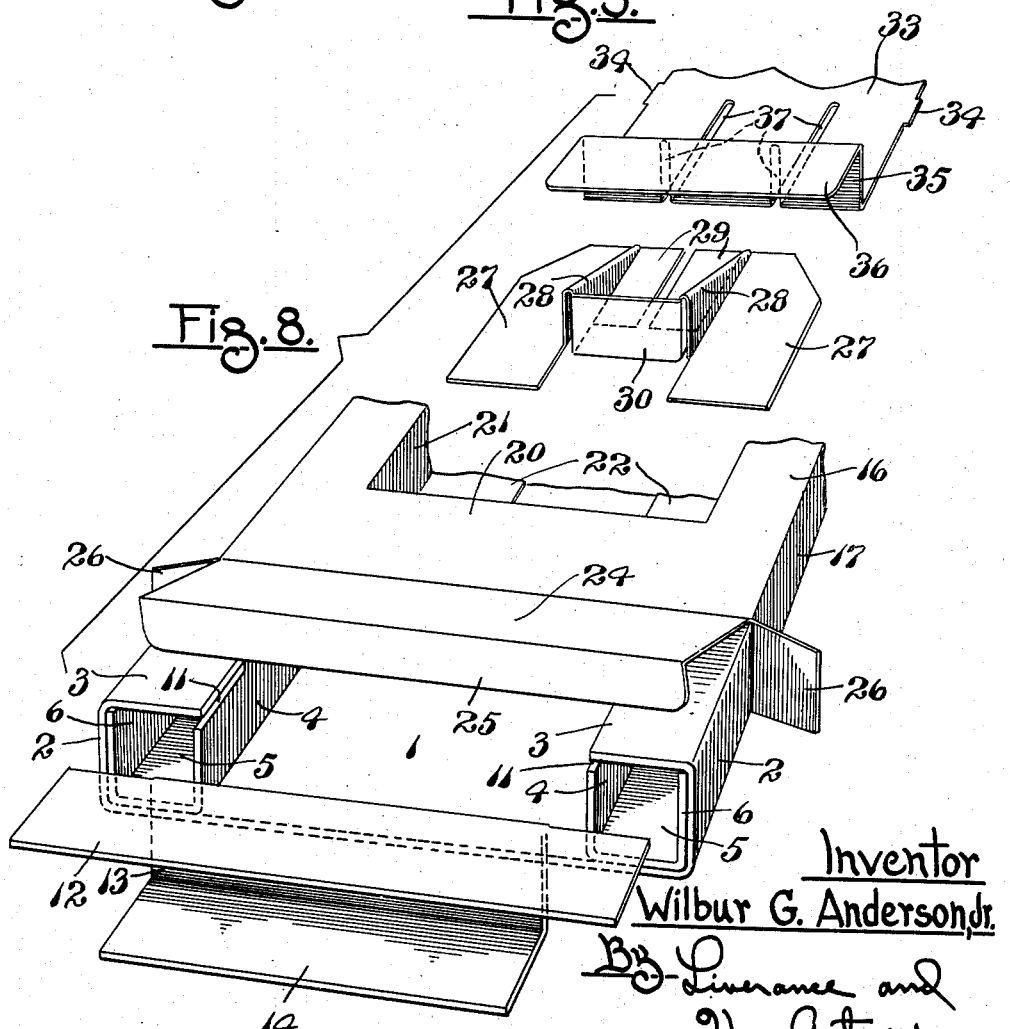
Fig. 8 is a fragmentary perspective view, somewhat similar to Fig. 5, of the structure of the parts at the upper end of the display stand, said parts being in disassembled relation.

At the upper end of the stand and located one at each longitudinal side rail, similar slots, as at 11, are cut at the corners joining the parts 3 and 4 (Fig. 8). A cross bar is provided for the upper end consisting of a relatively long rectangular section 12 of paper board which may be inserted into the slots 11. From one longitudinal edge of the part 12 a web 13 extends downwardly at right angles for a short distance and is then turned again at right angles making a flange 14 parallel to the upper bar 12. The length of the sections 13 and 14 is equal to the distance between the inner sides 4, so that when the projecting end portions of the part 12 are passed into the slots 11 underneath the outer parts 3 of the side rails, the lower flange 14 bears snugly against the front side of the back plate 1, and the connecting web 13 between the parts 12 and 14 is disposed in a plane at right angles to the back.

The projecting end portions of the section 12 may likewise be stapled to the outer members 3 of the side rails in the same manner that the cross bar is stapled by the staples 10.

Over the frame thus made a cover or envelope of relatively thin paper board is placed, which in practice may have a desired attractive color. The cover initially is in the form of an elongated tube, rectangular in cross-section having an outer side 16, ends 17 turned at right angles thereto and with back flaps 18 which overlap each other (Fig. 4) turned at right angles from the lower edges of the sides 17, the overlapping parts 18 being cemented or otherwise secured together. The outer side 16 is cut across adjacent both its upper and lower ends, leaving connecting cross members 19 and 20 at such upper and lower ends respectively. A longitudinal cut is made in the front 16 substantially mid-way between the ends of the two transverse cuts and extending from one to the other. The material is bent downwardly at right angles as at 21 to lie against the inner sides of the inner members 4 of the side rails, terminating in right angle bent sections 22 which bear against the front side of the backing sheet or plate 1. This provides an elongated rectangular opening, the sides of which are at the inner sides of the side rails of the stand, the upper end of which is provided by the web 13 previously described, while the lower end of said rectangular opening is at the upper edge of the cross section 19. This tubular envelope may be slid over and lengthwise of the back plate and the side rails formed therewith to completely cover it; and when at proper position the parts 21 and 22 may be pressed inwardly to the positions shown in Figs. 5 and 8. At selected points at the corners made by the juncture of the sections 21 and 22, short slots 23 are cut, the purpose of which will later appear.

At the upper end of the tubular envelope and at its outer side a flap 24 is integrally and hingedly connected to the section 20 (Fig. 8) and from the flap 24 a terminal flap 25 is bent at right angles. Likewise the upper end of each side 17 is provided with an integral and hingedly connected flap 26. When the covering envelope has been placed over the backing plate 1 and its side rails, the flaps 26 are turned inwardly over the upper ends of the side rails, the flap 24 is turned to the rear at right angles and the terminal flap 25 is inserted between the back plate 1 and the rear side of the envelope provided by the connected together overlapping sections 18, thus completing and closing the upper end of the display stand.

After the cover envelope has been placed over the main supporting back and side rails as described, at the upper end of the display stand a member is laid against the front of the back 1. Such member is made from a sheet of flat paper material to provide spaced flat wings 27 at the adjacent edges of which are formed upwardly extending U-shaped ribs 28 of triangular form; and from the inner legs of which flat plate extensions 29 are provided lying in the same plane with the wings 27. The wider ends of the U-shaped ribs 28 are connected by a cross piece 30, as fully shown in Fig. 8. This member is placed against the back plate 1 with the upper ends of the wings 27 inserted underneath the flange 14 of the upper end member of the stand, and with the cross piece 30 brought against the face of the web 13, whereby the member is frictionally held in place with the two spaced ribs 28 paralleling each other and extending outwardly as shown. At spaced apart places in the length of the display stand, bars 31 triangular in cross section and made from a single piece of paper material are located, having slots 32 at their upper corners. Over said triangular shaped bars 31 a sheet of paper material indicated at 33 is placed. It is of a width so as to snugly fit between the spaced side rails of the stand and at proper points at each side has projecting lugs 34 to enter the slots 23 (Fig. 5). At the upper end the paper sheet 33 is turned outwardly at right angles as at 35 for a distance and then again at right angles in a plane paralleling the plane of the sheet 33, to make a terminal flange 36, which is inserted underneath the section 20 of the covering envelope and between it and the part 12 of the upper end member. Two slots 37 spaced from each other are cut adjacent the end of the sheet 33 and also vertically in the part 35, whereby the U-shaped ribs 28 extend through said slots, as shown in Fig. 1. Likewise over the triangular shaped bars 31 the sheet 33 is bent into an inverted V-form, as at 38, to cover said bars, and over the slots in said bars the sheet is also cut with like slots. It will be noted that the projections 34 and the cooperating openings 23 to receive them (Fig. 1) are, a part of them, located so as to position and hold the bars 31 against movement.

At the lower end of the sheet 33 it is turned upwardly in a web 39 (Fig. 5) and then again turned at right angles to make a terminal flange 40. A filler bar member 41 of rectangular shape folded from a single piece of paper material is inserted underneath the lamination 7, and substantially fills the space therebetween and the back plate 1 at its lower end. The flange 40 is inserted between the filler bar 41 and the under lamination 7 (Fig. 2), and the web 9 comes against the upper side of the filler member 41.

The stand is completed at its lower end by a paper foot member which is shown disassembled in perspective at the lower part of Fig. 5 of the drawings. A box-like member is made from paper board and, referring to Fig. 5, includes a vertical back section 42, from the upper edge of which a flap 43 extends, having an integral hinged connection thereto. From the lower edge of the back 42 a horizontal section 44 extends outwardly for a distance and is then turned upwardly to make a front side 45 of less height than the back 42. Ends 46 of trapezoidal form are turned rearwardly from the end edges of the front 45 until the back 42 is reached, and then terminate in inturned flaps 47 which are stapled by staples 48 to said back 42. From the lower edges of the ends 46 inturned horizontal sections 44a are provided, which a distance within the ends 46 are turned upwardly to make the vertical sections 49, which are spaced from and substantially parallel to the ends 46. These sections 49 at their free edges are slotted for a distance to make the slots 50 and adjacent their rear corners are cut away to provide shallow elongated recesses 51.

From the upper edge of the front member 45, as shown in Fig. 5, the paper board material is turned outwardly to provide a relatively large flap indicated generally at 52. The flap is cut with three cuts 53 and 54, the cuts 53 being located inwardly of and parallel to the ends of the flap 52 and the cut 54 being parallel to the longitudinal free edge of the flap 52 and located so that its ends join the cuts 53 between the ends thereof. The material of the flap 52 is scored at 57 to be readily bendable upon the lines shown, said scoring lines 57 extending outwardly from the outer ends of the cuts at 53, whereby there is made a flap 55 hinged to the section 45 and bounded by the lines produced by the cuts at 53 and 54, and another flap 56 integral with the flap 52 which turns about the axis of the lines 57.

Within the structure thus produced a support of channel form, and made from a single piece of paper board, is located, having a leg 58, a web 59, and a second leg 60 paralleling the leg 58. Projecting lugs 61 extend from the web 59 adjacent the corners where it joins with the leg 58, which enter the slots 50, while other projecting lugs 62 adjacent the outer edges of the leg 58 are received in the recesses at 51. After the channel shaped member is placed within the enclosure as described, the projecting portion of the flap 52 is turned about the lines 57 to a position at right angles to its first position, and then such projecting portion is turned to bring the section 56 and the part 52 which is in the same plane therewith, back of the open side of the channel shaped member and parallel to the back 42.

The foot structure is then in shape to be applied to the lower end of the stand frame. The flap 43 is inserted between the lower portion of the back section 1 and the adjacent back portions 18 of the covering envelope. Then the whole foot structure is turned about the hinged axis connecting the flap 43 with the section 42 through an angle of 90°, bringing the section at 55 over the rounded connecting bend 9, whereupon the part 55 is turned inwardly and underneath and against the lamination 7 of the cross bar shown. This connection is done prior to the insertion of the filler bar 41 in the place it occupies. After the filler block has been inserted in place, the end flange 40 of the member 33 is inserted between the filler block and the flap 55 as shown in Fig. 2. The ends 46 of the foot structure of the stand being of trapezoidal form, partly pass over the lower end portions of the side rails of the stand, as shown in Fig. 1.

It will be evident when the foot structure of the stand has been attached in place, that it projects outwardly at right angles to the body of the stand, bringing the web 59 of the inner channel member into an upper horizontal plane, as shown in Fig. 2, and located a short distance below and parallel to the part 45 which after the attachment lies at the upper side of the foot member and over the web 59. In the section 45 cuts are made at three sides of portions 62, whereby the free ends thereof may be pressed downwardly until they come to rest against the web 59 (Fig. 2). Golf clubs having heads 63 may be placed with the heads bearing against the part 62 and partially entering the openings made by their downward displacement. The shanks 64 of said clubs are received in the slots 32 of the triangular bars 31 and of the covering portions 38 of the member 31. As shown in Fig. 1, a third club inverted in position may be placed with its head 63 between the projecting rib members 28, the shank or handle being in the slots 32 the same as the shanks or handles of the other clubs.

The stand as constructed is of light weight but is amply strong and rigid. With the golf clubs or similar articles located therein a very attractive display may be had. But the stand is also useful as a holder for the clubs in shipment from the manufacturer to the retailer. The manufacturer who sells clubs may purchase the stands, place the clubs therein and then send the clubs with a display stand therefor to the retailer.

Figure 9:
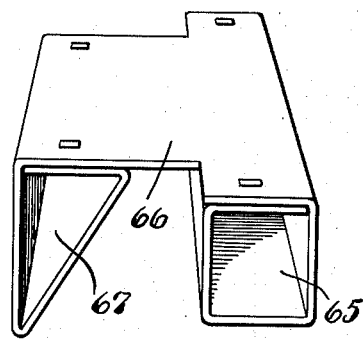
Fig. 9 is a perspective view showing a second retaining and packing member used in shipment.

For application at the upper end of the stand, a filler such as shown in Fig. 9 may be provided made from a single length of paper board material, at one end formed into a block 65 of rectangular cross section, with an integral section 66 extending from one side thereof which is continued in a second block of shorter length and of triangular shape, as at 67. This may be placed over the head 63 of the intermediate golf club, with the block 63 against the upper end of the stand and above the club head 63, while that shown at 67 is located below the head 63 as in Fig. 2. At the lower end a structure of the character shown in Fig. 6 will be used, consisting of a hollow block made from a single length of folded paper board and of trapezoidal cross-section as at 68, connected with which is a band frame of paper stock having ends 69 connected by the sides 70 and 71. This is placed with the open part of the band underneath the foot of the stand and with the block 69 over the heads 63 of the clubs which are positioned with their heads engaged with the foot of the stand, also as in Fig. 2. This provides a holding means for the clubs to prevent their disconnection from or looseness with respect to the stand in shipment. The outer sides of these filler and holding members are in the same plane and the entire assembled structure may be readily placed within a suitable shipping case 72, such as is shown surrounding it in Fig. 2. When a stand with the clubs therein has reached its destination, the outer shipping case is removed, and the filler and holding members likewise removed, leaving the stand with the clubs therein as in Fig. 1, ready to be placed in the window or any other position for display.

Figure 10:
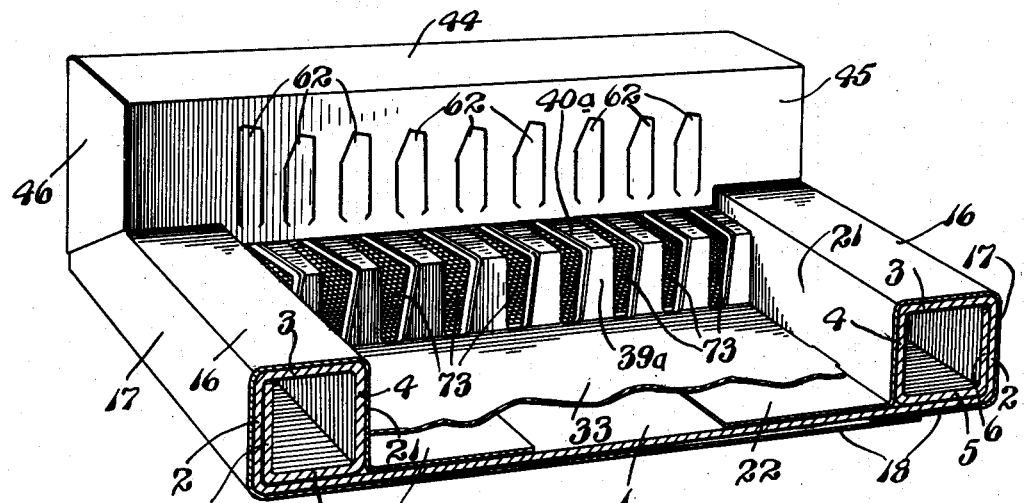
Fig. 10 is a perspective view of the lower end of a slightly modified form of structure of display stand, particularly adapted for holding and displaying golf club irons.
Figure 11:
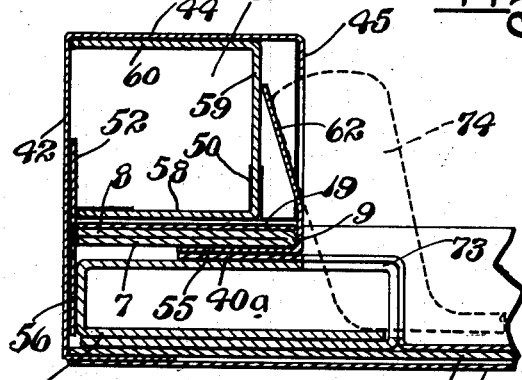
Fig. 11 is a fragmentary transverse section through the structure shown in Fig. 10.
Figure 12:
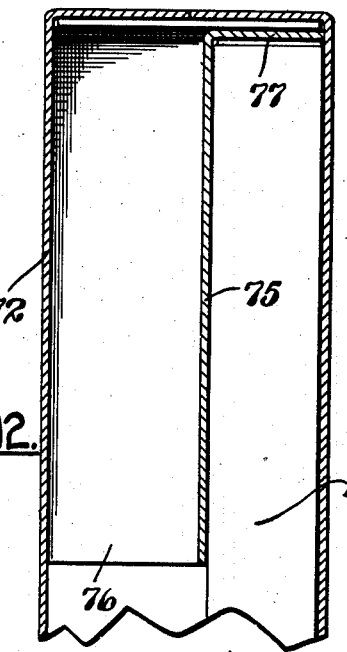
Fig. 12 is a fragmentary vertical section from front to rear of the upper end of a shipping box in which a stand, like that in Fig. 10, carrying irons alone is shipped.

In Figs. 10 and 11 the structure is modified slightly in that the lower end of the sheet 33 is turned upwardly to make the flange 39a above the foot member, and the filler member or block 41 is correspondingly extended in length so that the terminal flange or flap 40a, corresponding generally to the lower terminal flange or flap 40 in the previously described structure, is of greater length and covers the outer upper corner of the filler block 41. In said outer upper corner portion of the filler block 41 and correspondingly in the corner portion at the junction of the parts 39a and 40, a plurality of slots 73 spaced from each other are cut, one for each of the golf clubs to be carried and, therefore, one for each of the members 62 which are partially cut from the upper side 45 of the foot extension of the stand. Such a construction is particularly adapted for holding, displaying and shipping the golf clubs known as irons, the heads 74 shown in dotted lines in Fig. 11 resting upon the partially severed sections 62 and being received partially in the slots at 73 as shown. In such case there is no reversal of a part of the clubs, as in Fig. 1, but the heads of all of the clubs are at a lower position in the stand.

Figure 13:
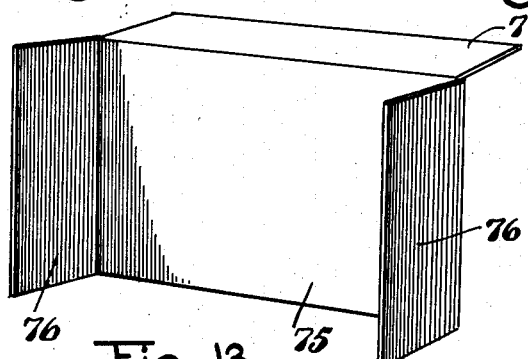
Fig. 13 is a filler member for the upper end of the stand and which is used within the shipping box shown in Fig. 12.

With such a construction, when the stand filled with the irons is to be shipped, at the upper end a spacing or filler construction such as shown in Fig. 13 is used. It includes a back 75 with end flanges 76 turned at right angles therefrom and a top flange 77 turned rearwardly at right angles. The flange 77 is placed over the upper end of the stand, the back 75 covers the upper portion of the front open side of the stand, and the flanges 76 extend forward to the sides of the shipping case 72, as shown. This holds the stand securely against movement at its upper end. The same filling and holding construction for the lower end of the stand is used substantially as shown in Fig. 2.

The construction of display stand is very novel. The parts are very easily assembled in the first instance. After they have been assembled, it is possible to disassemble them though not nearly so easily as was the assembly. In practice and use the stand is not designed to be many times set up and knocked down and shipped from one place to another. In the first instance the assembly should be rapid, easy and such that unskilled workmen can readily accomplish the assembly, but after assembly the parts should remain snugly and securely in operative position. This is attained with the structure of stand which has been described.

The stand because of its light weight adds little shipping weight to a set of golf clubs which are to be placed in and which are to be displayed therefrom after destination has been reached. The paper board material used to make the stand is an economical material to use, so that the cost is kept substantially at a minimum. The invention is of a very practical, useful and serviceable character.

The claims appended hereto define the invention, which is to be considered comprehensive of all forms of structure coming within their scope.

I claim:

1. In a construction of the class described, a back plate, longitudinal side rails therefor, cross members connecting the side rails at their ends, said side rails being positioned outwardly from the back plate, and a tubular covering envelope over said back, side rails and cross members, said envelope being slit longitudinally at its front side between the side rails, and slit transversely adjacent its ends substantially at the inner edges of the cross members, and having the portions at each side of said longitudinal slit extending inwardly against the inner sides of the side rails and thence inwardly toward each other against the front side of said back.

2. A construction containing the elements in combination defined in claim 1, combined with a filler member located between the ends of the side rails transversely of said back plate at each end thereof, and a cover sheet located between the side rails and over and against the front side of said back and at each end having an outwardly extending web to engage against the adjacent side of the filler, terminating in flaps turned at right angles and extending in opposite directions parallel to the plane of said cover sheet and to said cross members.

3. A construction containing the elements in combination defined in claim 1, combined with a filler member located between the ends of the side rails transversely of said back plate at each end thereof, and a cover sheet located between the side rails and over and against the front side of said back plate and at each end having an outwardly extending web to engage against the adjacent side of the filler, terminating in flaps turned at right angles and extending in opposite directions parallel to the plane of said cover sheet and to said cross members, said filler sheet at its side edges having projecting lugs, and said covering envelope at the inner portions thereof covering the inner sides of the side rails having openings to receive the lugs, as specified.

4. A construction of the class described comprising, a back plate of paper board material having integral side rails folded upwardly and inwardly from the side edges of the back plate, cross members connecting the side rails at the ends thereof spaced from and parallel to the back plate, a covering envelope of paper stock material of rectangular shape in cross section located over said back and side rails and having its front side longitudinally slit substantially midway between said side rails and transversely slit a short distance from each end thereof, with the parts of said covering envelope each side of the longitudinal slit turned inwardly against the inner sides of the side rails and thence inwardly toward each other against the front side of the back plate, spacing bars having slots therein located transversely of and at the front side of the back plate between said side rails, said bars being spaced from each other, a cover sheet of paper stock material located against the front side of the back plate over said spacing bars, said spacing bars and covering sheet having alined slots therein spaced from each other, and interengaging means between the covering sheet and said covering envelope for normally securing said covering sheet against displacement.

5. A construction containing the elements in combination defined in claim 4, said covering sheet adjacent its upper end having spaced longitudinal slots therein and a member of paper stock material provided with projecting ribs located against the back plate with said ribs extending through said slots in the covering sheet, as and for the purposes specified.

6. In a display stand, a back plate, side rails at the opposite side edges of the plate extending forwardly therefrom, cross members extending between the end portions of said side rails adjacent their outer faces, a covering envelope of generally tubular form having a rectangular cross section covering said back and side rails and cross members, the intermediate portion of said covering envelope at its front side being longitudinally slit between the side rails and transversely slit adjacent the inner edge of each cross member and bent inwardly along the inner sides of said side rails and against the front side of the back plate, a foot member made of paper board material extending at right angles from one end of said back plate and side rails having a terminal flap held between the back plate and covering envelope and a second terminal flap folded inwardly against the adjacent cross member, and a filler member disposed between the back plate and said cross member with the last mentioned flap of the foot member clamped between said filler member and cross member.

7. A shipping and display stand comprising, an elongated back plate, side rails disposed longitudinally and one at each side thereof, transverse means connecting the upper ends of said side rails at one end of the back plate, and a hollow foot member folded from a single length of cardboard material connected to and projecting from the other end of said back plate and said side rails, thereby providing an open rectangular space at the front of the stand for reception of articles to be displayed, a filler member within said foot member, spaced transverse bars between the side rails and at the front side of said back plate having spaced notches therein to receive elongated articles and to hold them apart from each other, said foot member at its upper side being provided with recesses to receive the lower ends of the articles held in said stand, and said articles in said recesses resting on said filler member.

8. In a display stand, a back plate, a side rail at each side edge thereof extending forwardly and the full length of the back plate, cross members connecting the side rails at their ends and spaced from the back plate, a covering envelope over said back plate, side rails and cross members having its front side longitudinally slit and pressed downwardly against the inner sides of the side rails and the front side of the back plate, a foot member folded from a single piece of flat material to have a bottom, a front side and a top, said bottom having an upturned flap received between the lower end of the back plate and the covering envelope, and said top having a flap at its rear edge turned downwardly to extend against the inner side of the lower cross member, and a filler block between the back plate and said lower cross member acting as a clamp between which and the lower cross member said last mentioned flap is positioned.

9. A foot member for display stands made from a single piece of flat material having a lower side or bottom, a front vertical side, an upper side or top substantially parallel to the bottom and vertical ends, the rear edge of the bottom having a terminal flap extending therefrom integrally and hingedly connected thereto, and the rear edge of said top having a flap integrally and hingedly connected thereto, partitions spaced from the ends extending between the top and bottom, and a channel shaped support located between and interlocked with said partitions having a web parallel to and spaced a short distance from the top, and spaced legs extending downwardly from said web, as specified.

10. A foot member for display stands made from a single piece of flat material having a lower side or bottom, a front vertical side, an upper side or top substantially parallel to the bottom and vertical ends, the rear edge of said bottom having a terminal flap extending therefrom integrally and hingedly connected thereto, and the rear edge of said top having a flap integrally and hingedly connected thereto, partitions paralleling said ends and spaced inwardly therefrom, a channel shaped support lying between the partitions and having interlocking engagement therewith, the web of said support paralleling the top of the foot member and the flanges thereof extending downwardly to said bottom, said flap connected to the front of said foot member being slit in lines parallel to the ends of the flap from the point of connection with said front outwardly but terminating short from the outer longitudinal edge of the flap, and also slit longitudinally between the first mentioned slits between the ends thereof, said flap also being scored for bending on lines parallel to the outer edge of the flap, said lines extending between the outer ends of the first mentioned slits to the ends of said flap, and said first mentioned slits being located inward from the ends of said flaps a distance substantially the same as the distance that the partitions are located inward from the ends of the foot member.

11. A shipping and display stand comprising, an elongated back plate, side rails disposed longitudinally, one at each side thereof and extending forwardly from said back, cross bars extending over the end portions of said back between said side rails and spaced from the back, a member of sheet form lying against the front side of the back, and bent outwardly at right angles at each end for a short distance and then extending parallel to said back to provide terminal flaps, clamping members at each end of said back located at the front side thereof between said back and cross members over which said end flaps of said sheet member extend, the clamping member at one end of the back being of a hollow rectangular form, and at its upper outer corners having a plurality of slots cut therein, the cover sheet thereover having alined slots therein, for the purposes specified.

12. In a shipping and display stand, a back plate of rectangular form, a side rail at each longitudinal edge thereof positioned in front of the back plate, cross members connecting the side rails at their ends, a covering envelope over said back, side rails and cross members, said covering envelope being of substantially tubular form and rectangular in cross section and longitudinally slit at its front side between said cross members and transversely slit at the inner edges of said cross members between the side rails, the parts of said covering envelope at each side of the longitudinal slit being turned inwardly to lie against the inner sides of the side rails and against the front side of said back plate, a cover sheet located at the front side of the back plate between said side rails, spaced bars located transversely between said side rails and at the front side of the back and lying thereagainst, said cover sheet having transverse raised portions to embrace the outer sides of said bars, and said cover sheet at its side edges having projecting lugs at spaced apart distances in the length of the sheet, certain of said lugs being located one at each side of each end of said cross bars, said covering envelope having openings substantially at the juncture of said back sheet with the inner sides of the side rails adapted to receive said lugs, as specified.

13. A display stand comprising, a back plate of elongated rectangular outline having a side rail at each longitudinal side edge thereof, said back plate and side rails being formed from a single piece of paper board material with the side rails folded into hollow elongated form and disposed at the front of the back plate, the inner sides of said side rails being slotted in each end thereof adjacent their outer edges, a cross member of paper board material located at one end of said side rails and extending between the same and received in the slots at said end of the side rails, a channel shaped member of paper board material having an outer flange received at its end portions in the slots at the other ends of said side rails, and having a web extending to said back plate, and a second flange bearing against said back, a covering envelope of paper stock material of tubular form and rectangular in cross section located over the back, side rails and cross members, said covering envelope at its front side being longitudinally slit between the cross members and transversely slit adjacent and paralleling the inner edges of said cross members, the free portions of said envelope at the sides of said longitudinal slit being turned inwardly to cover the inner sides of the side rails and having terminal portions lying against the front side of said back, a cover sheet located over said back and said terminal portions of the envelope, at its ends having outturned webs terminating in outwardly extending flaps which parallel said back, the flap at the upper end being received between the upper side of said channel shaped cross member and the portion of the covering envelope thereover, and a filler of rectangular cross section at the lower end of and in front of the back located between said back and the lower cross member, the terminal flap of said cover sheet lying between said filler member and said lower cross member.

14. In a display stand, a back plate adapted to have articles rest thereagainst for display purposes, a covering envelope over said back plate transversely slotted near its lower end, a foot member to support the lower ends of the displayed articles at the bottom of said back plate, said foot member being folded from a single piece of flat material to have a bottom, a front side and a top, said top at its rear edge having a flap turned downwardly and extending through the transverse slot and received between the lower end of the back plate and the covering envelope, and means to confine the articles on the stand.

15. In a display stand, a vertical back plate to support articles, side rails disposed longitudinally and one at each side thereof, transverse means connecting the side rails at their upper and lower ends and spaced from said back, a covering envelope over said back plate, side rails and transverse connecting means, a foot member to support the lower ends of the articles folded from a single piece of flat material to have a bottom, a front side and a top, said top at its rear edge having a flap turned downwardly and received between the lower transverse means and the covering envelope, and means to confine the articles on the stand.

16. In a display stand, a vertical back plate to support articles, side rails disposed longitudinally and one at each side thereof, transverse means connecting the side rails at their upper and lower ends and spaced from said back, a covering envelope over said back plate, side rails and transverse connecting means, a hollow foot member to support the lower ends of the articles folded from a single piece of flat material to have a bottom, a front side and a top, said top at its rear edge having a flap turned downwardly and received between the lower transverse means and the covering envelope, a filler member within said foot member, and recesses in the top of said foot member to receive the ends of articles displayed on said stand, said articles adapted to rest on said filler member.

WILBUR G. ANDERSON, Jr.